United States Patent [19]

Shyu

[11] Patent Number: 5,471,412

[45] Date of Patent: Nov. 28, 1995

[54] RECYCLING AND PARALLEL PROCESSING METHOD AND APPARATUS FOR PERFORMING DISCRETE COSINE TRANSFORM AND ITS INVERSE

[75] Inventor: Rong-Fuh Shyu, Hsinchu, Taiwan

[73] Assignee: Winbond Electronic Corp., Hsinchu, Taiwan

[21] Appl. No.: 143,837

[22] Filed: Oct. 27, 1993

[51] Int. Cl.[6] .................................. G06F 7/38; G06F 7/52
[52] U.S. Cl. .......................... 364/725; 364/736; 364/754
[58] Field of Search .................................. 364/725, 726, 364/736, 754

[56] References Cited

U.S. PATENT DOCUMENTS

| Re. 34,734 | 9/1994 | Cambonie | 364/725 |
| 5,029,122 | 7/1991 | Uetani | 364/725 |
| 5,257,213 | 10/1993 | Kim et al. | 364/725 |
| 5,329,318 | 7/1994 | Keith | 348/699 |

Primary Examiner—Roy N. Envall, Jr.
Assistant Examiner—Emmanuel L. Moise
Attorney, Agent, or Firm—Harness, Dickey & Pierce

[57] ABSTRACT

A discrete cosine transform (DCT) apparatus, capable of generating one-dimensional and two-dimensional DCT and inverse DCT results, uses six-stage DCT/IDCT fast algorithms to process a sequence of input data of an 8×8 data block. Each of the different stages of the DCT/IDCT fast algorithms involves a number of butterfly operations, which can be performed by a butterfly operation unit of the DCT apparatus, or a number of intrinsic multiplications, a number of post-addition multiplication operations, or a number of post-multiplication subtraction operations, all of which can be performed by a multiplication operation unit. A control unit of the DCT apparatus permits the use of a single butterfly operation unit and a single multiplication operation unit to perform the different stages of the DCT/IDCT fast algorithms. The results of each stage of the DCT/IDCT fast algorithms are stored in a data register unit of the DCT apparatus to serve as inputs for the succeeding stages of the DCT/IDCT fast algorithms.

11 Claims, 8 Drawing Sheets

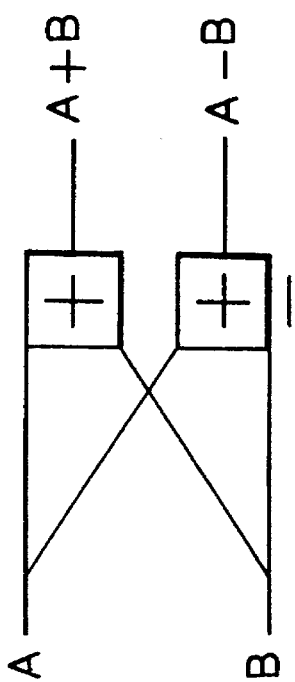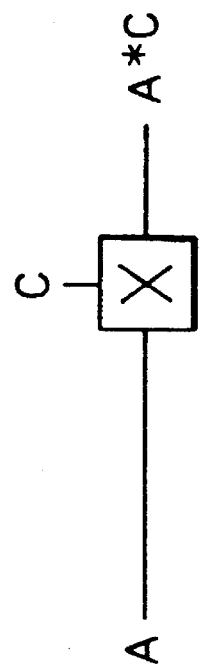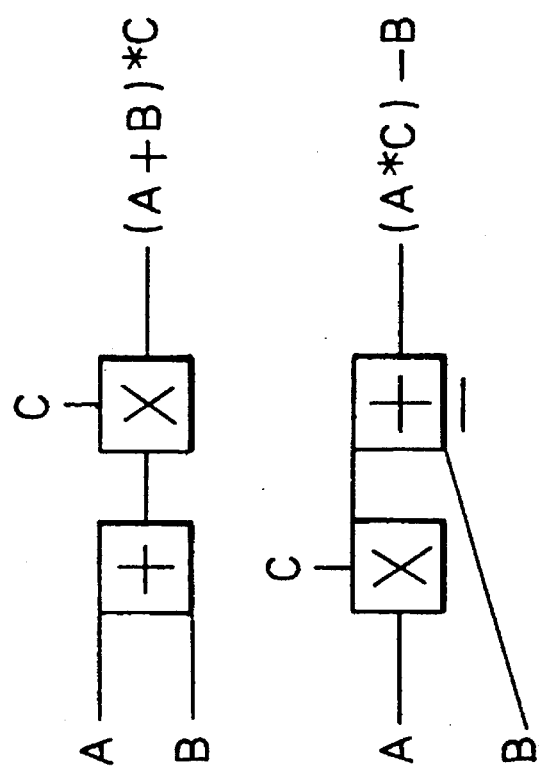

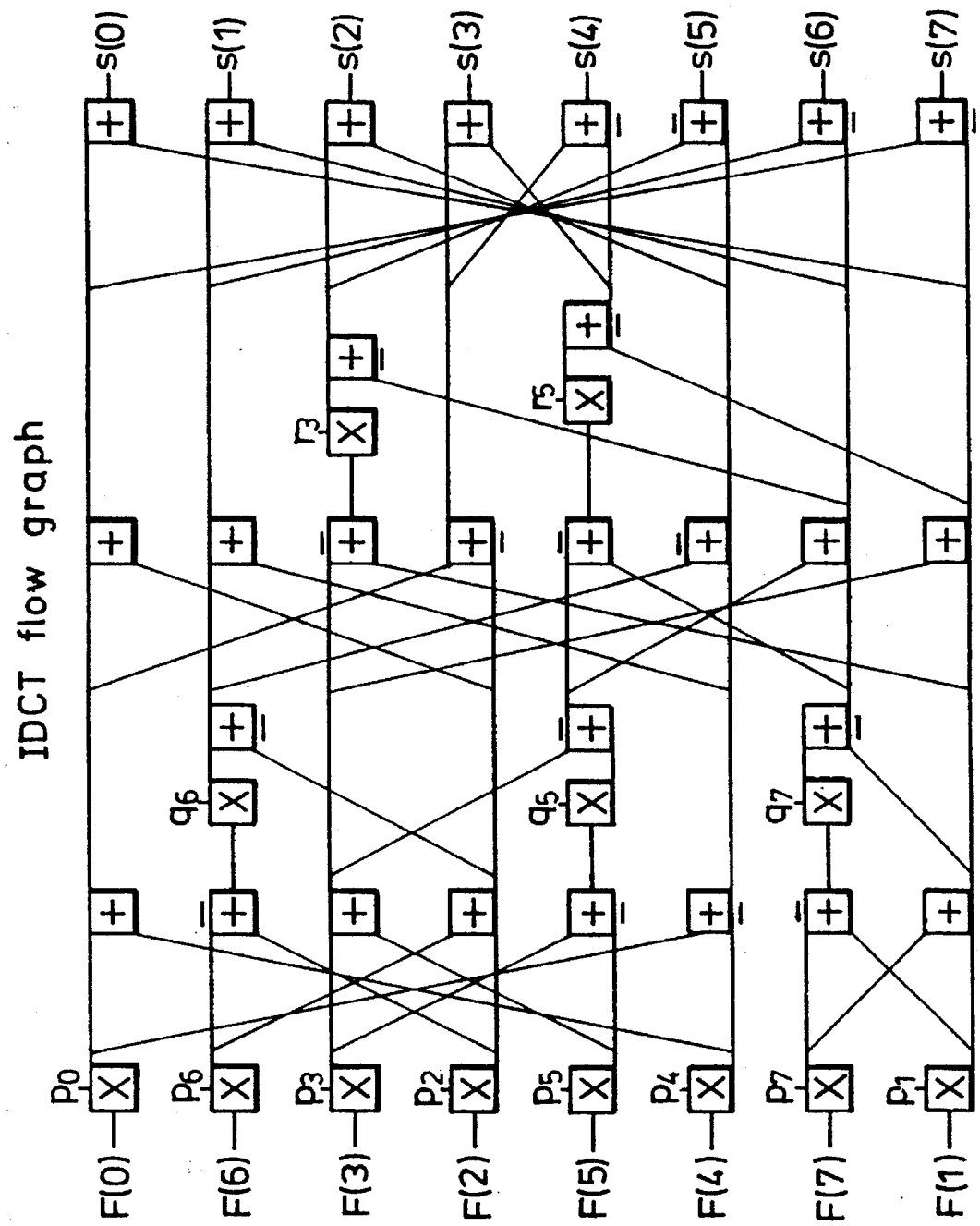

RECYCLING AND PARALLEL PROCESSING METHOD AND APPARATUS FOR PERFORMING DISCRETE COSINE TRANSFORM AND ITS INVERSE

BACKGROUND OF THE INVENTION

1. Field of the Invention

The invention relates to a method and apparatus for performing discrete cosine transform and its inverse, more particularly to a DCT/IDCT apparatus which is capable of real-time processing and which has a relatively simple and small hardware construction.

2. Description of the Related Art

Forward and inverse discrete cosine transforms (DCT/IDCT) are performed during the compression and decompression of digital image data. In a conventional digital image compression operation, an original image signal is usually divided into a number of 8×8 pixel blocks, each of which undergo a DCT operation so as to generate DCT transform data. In a conventional digital image decompression operation, IDCT is performed with the DCT transform data which result from the DCT of one pixel block in order to retrieve the original image signal.

If a two-dimensional DCT/IDCT operation is to be executed, each row (or column) of a data block undergoes a first one-dimensional DCT/IDCT. Each column (or row) of the resulting DCT/IDCT transform data then undergoes a second one-dimensional DCT/IDCT, thus completing the two-dimensional DCT/IDCT operation. The one-dimensional DCT of an 8×8 pixel block can be obtained from the following equation:

$$F(k) = \frac{1}{2}C(k) \sum_{m=0}^{7} S(m) \cos[(2m+1)k\pi/16], k=0,1,\ldots 7$$

wherein:

$C(k)$ is equal $2^{-\frac{1}{2}}$ when $k=0$ and is equal to 1 when $k=1, 2, \ldots 7$;

$S(m)$ is the pixel data in spatial domain; and $F(k)$ is the resulting DCT transform data.

A DCT fast algorithm which can be derived from the above equation involves thirteen multiplication operations and twenty-nine addition/subtraction operations. FIG. 1 is a flow graph illustrating the DCT fast algorithm. The DCT fast algorithm uses three kinds of arithmetic operations: butterfly, intrinsic multiplication, and post-addition multiplication, as shown in FIGS. 2A to 2C. Referring to FIG. 2D, a fourth kind of arithmetic operation, the post-multiplication subtraction, is used in a corresponding IDCT fast algorithm.

Referring once more to FIG. 1, the DCT fast algorithm uses twelve butterfly operations, five post-addition multiplication operations and eight intrinsic multiplication operations. A conventional apparatus that is capable of performing the DCT flow graph of FIG. 1 can be divided into six operating units: a first unit capable of performing four butterfly operations; a second unit capable of performing two post-addition multiplication operations; a third unit capable of performing four more butterfly operations; a fourth unit capable of performing three post-addition multiplication operations; a fifth unit capable of performing another four butterfly operations; and a sixth unit capable of performing eight intrinsic multiplication operations.

The IDCT fast algorithm can be obtained by performing the DCT fast algorithm in a reverse sequence. FIG. 3 illustrates the flow graph of the IDCT fast algorithm. Note that a conventional apparatus which is capable of performing the IDCT flow graph can also be divided into six operating units: a first unit capable of performing eight intrinsic multiplication operations; a second unit capable of performing four butterfly operations; a third unit capable of performing three post-multiplication subtraction operations; a fourth unit capable of performing four more butterfly operations; a fifth unit capable of performing two more post-multiplication subtraction operations; and a sixth unit capable of performing another four butterfly operations.

If it is desired to process an 8×8 data block with the use of two-dimensional DCT/IDCT, a first apparatus that is capable of performing the above described DCT/IDCT fast algorithms is provided so as to execute a first one-dimensional DCT/IDCT operation. The transform data resulting from the first apparatus are then provided to a second apparatus which is similar to the first apparatus in order to perform a second one-dimensional DCT/IDCT operation.

Therefore, the conventional DCT/IDCT apparatus are relatively expensive since they involve the use of large and relatively complicated hardwired logic circuits which are designed in order to achieve precise pipeline processing at a very high processing speed. However, in actual practice, most applications do not require data processing at a very high processing speed in order to achieve real time transformation.

SUMMARY OF THE INVENTION

The main objective of the present invention is to provide a DCT/IDCT apparatus which has a relatively simple and small construction and which is relatively inexpensive.

Another objective of the present invention is to provide a DCT/IDCT apparatus which is capable of processing data in real time.

Accordingly, the discrete cosine transform apparatus of the present invention is capable of performing a six-stage DCT fast algorithm to process a sequence of input data of an 8×8 data block so as to generate a sequence of transform data. The DCT fast algorithm includes first, third and fifth stages, each of which involving a plurality of butterfly operations, second and fourth stages, each of which involving a plurality of post-addition multiplication operations, and a sixth stage involving a plurality of intrinsic multiplication operations. The DCT apparatus comprises:

an input unit receiving the input data;

a butterfly operation unit controllable so as to perform the first, third and fifth stages of the DCT fast algorithm and so as to generate respectively first-, third- and fifth-stage output data when performing the first, third and fifth stages of the DCT fast algorithm;

a multiplication operation unit controllable so as to perform the second, fourth and sixth stages of the DCT fast algorithm and so as to generate respectively second-, fourth- and sixth-stage output data when performing the second, fourth and sixth stages of the DCT fast algorithm;

a data register unit connected to the butterfly operation unit and the multiplication operation unit and controllable so as to store the first-, second-, third-, fourth- and fifth-stage output data therein;

a control unit connected to the input unit, the butterfly operation unit, the data register unit and the multiplication operation unit;

the control unit controlling the input unit to provide the input data to the butterfly operation unit in order to enable the butterfly operation unit to perform the first stage of the DCT fast algorithm;

the control unit further controlling the data register unit to store the first-stage output data from the butterfly operation unit therein;

the control unit further controlling the data register unit to provide predetermined ones of the first-stage output data to the multiplication operation unit in order to enable the multiplication operation unit to perform the second stage of the DCT fast algorithm when the predetermined ones of the first-stage output data have been stored in the data register unit;

the control unit further controlling the data register unit to store the second-stage output data from the multiplication operation unit therein;

the control unit further controlling the data register unit to provide the first- and second-stage output data in a predetermined sequence to the butterfly operation unit in order to enable the butterfly operation unit to perform the third stage of the DCT fast algorithm after the butterfly operation unit has finished performing the first stage of the DCT fast algorithm;

the control unit further controlling the data register unit to store the third-stage output data from the butterfly operation unit therein;

the control unit further controlling the data register unit to provide predetermined ones of the third-stage output data to the multiplication operation unit in order to enable the multiplication operation unit to perform the fourth stage of the DCT fast algorithm when the predetermined ones of the third-stage output data have been stored in the data register unit;

the control unit further controlling the data register unit to store the fourth-stage output data from the multiplication operation unit therein;

the control unit further controlling the data register unit to provide the third- and fourth-stage output data in a predetermined sequence to the butterfly operation unit in order to enable the butterfly operation unit to perform the fifth stage of the DCT fast algorithm after the butterfly operation unit has finished performing the third stage of the DCT fast algorithm;

the control unit further controlling the data register unit to store the fifth-stage output data from the butterfly operation unit therein;

the control unit further controlling the data register unit to provide the fifth-stage output data to the multiplication operation unit in order to enable the multiplication operation unit to perform the sixth stage of the DCT fast algorithm; and an output unit connected to the multiplication operation unit and the control unit and controlled by the control unit so as to receive the sixth-stage output data from the multiplication operation unit.

The DCT apparatus is further capable of performing a six-stage IDCT fast algorithm to process a sequence of input data of an 8×8 data block so as to generate a sequence of transform data, the IDCT fast algorithm including a first stage involving a plurality of intrinsic multiplication operations, second, fourth and sixth stages, each of which involving a plurality of butterfly operations, and third and fifth stages, each of which involving a plurality of post-multiplication subtraction operations. Under this condition, the multiplication operation unit is controllable so as to perform the first, third and fifth stages of the IDCT fast algorithm and so as to generate respectively first-, third- and fifth-stage output data when performing the first, third and fifth stages of the IDCT fast algorithm, while the butterfly operation unit is controllable so as to perform the second, fourth and sixth stages of the IDCT fast algorithm and so as to generate respectively second-, fourth- and sixth-stage output data when performing the second, fourth and sixth stages of the IDCT fast algorithm. The control steps to be performed by the control unit are as follows:

(a) controlling the input unit to provide the input data to the multiplication operation unit in order to enable the multiplication operation unit to perform the first stage of the IDCT fast algorithm;

(b) controlling the data register unit to store the first-stage output data from the multiplication operation unit therein;

(c) controlling the data register unit to provide the first-stage output data to the butterfly operation unit in order to enable the butterfly operation unit to perform the second stage of the IDCT fast algorithm;

(d) controlling the data register unit to store the second-stage output data from the butterfly operation unit therein;

(e) controlling the data register unit to provide predetermined ones of the second-stage output data to the multiplication operation unit in order to enable the multiplication operation unit to perform the third stage of the IDCT fast algorithm when the predetermined ones of the second-stage output data have been stored in the data register unit;

(f) controlling the data register unit to store the third-stage output data from the multiplication operation unit therein;

(g) controlling the data register unit to provide the second- and third-stage output data in a predetermined sequence to the butterfly operation unit in order to enable the butterfly operation unit to perform the fourth stage of the IDCT fast algorithm after the butterfly operation unit has finished performing the second stage of the IDCT fast algorithm;

(h) controlling the data register unit to store the fourth-stage output data from the butterfly operation unit therein;

(i) controlling the data register unit to provide predetermined ones of the fourth-stage output data to the multiplication operation unit in order to enable the multiplication operation unit to perform the fifth stage of the IDCT fast algorithm when the predetermined ones of the fourth-stage output data have been stored in the data register unit;

(j) controlling the data register unit to store the fifth-stage output data from the multiplication operation unit therein;

(k) controlling the data register unit to provide the fourth- and fifth-stage output data in a predetermined sequence to the butterfly operation unit in order to enable the butterfly operation unit to perform the sixth stage of the IDCT fast algorithm after the butterfly operation unit has finished performing the fourth stage of the IDCT fast algorithm; and (l) controlling the output unit to receive the sixth-stage output data from the butterfly operation unit.

BRIEF DESCRIPTION OF THE DRAWINGS

Other features and advantages of the present invention will become apparent in the following detailed description of the preferred embodiments, with reference to the accompanying drawings, of which:

FIG. 2A illustrates a butterfly operation used in the flow graph shown in FIG. 1;

FIG. 2B illustrates an intrinsic multiplication operation used in the flow graph shown in FIG. 1;

FIG. 2C illustrates a post-addition multiplication operation used in the flow graph shown in FIG. 1;

FIG. 2D illustrates a post-multiplication subtraction operation that is used in an IDCT fast algorithm;

FIG. 3 is a flow graph of an IDCT fast algorithm that is to be performed by the DCT/IDCT apparatus of the present invention;

DETAILED DESCRIPTION OF THE PREFERRED EMBODIMENTS

Figure 4:
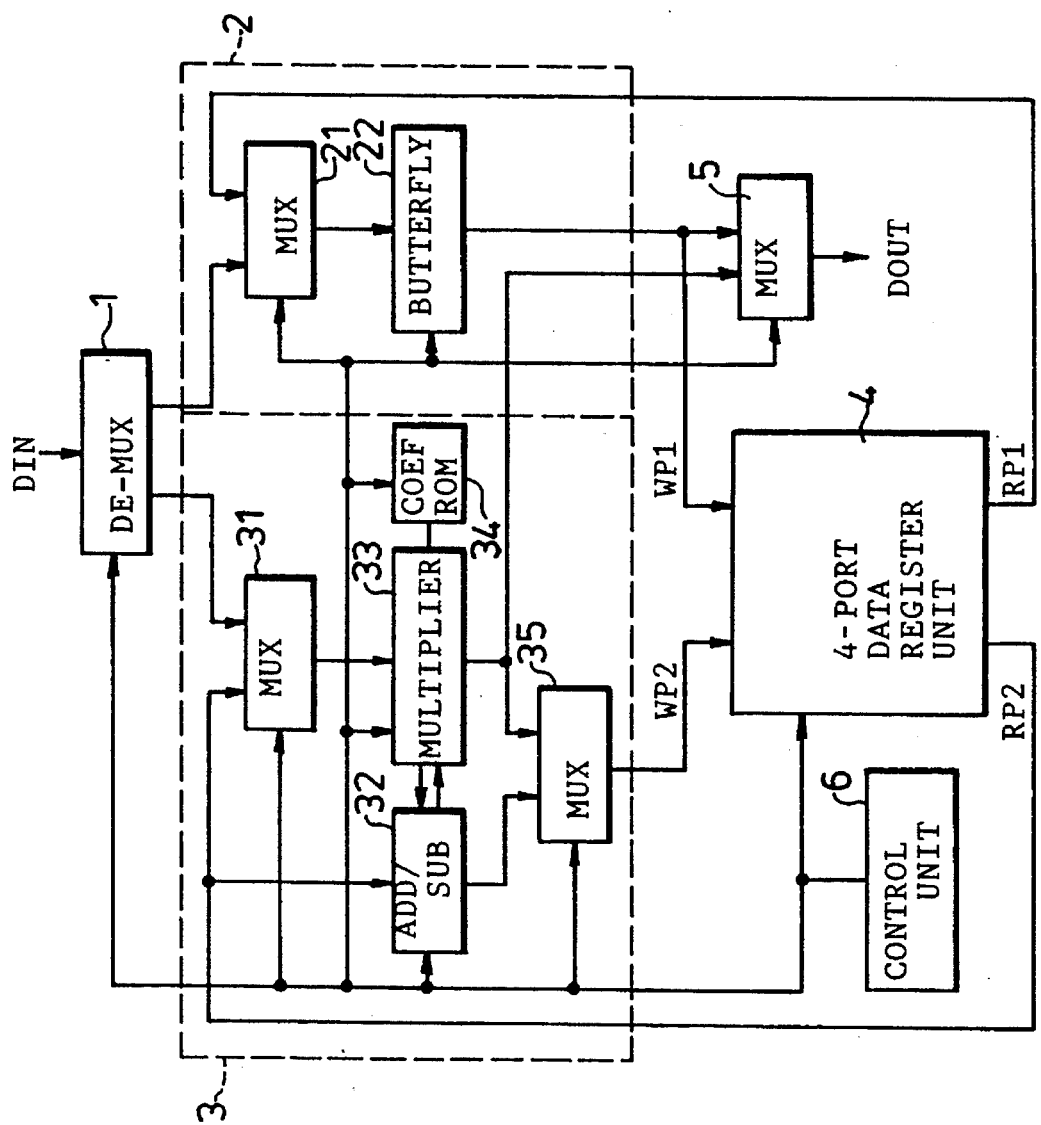
FIG. 4 is a schematic circuit block diagram of the first preferred embodiment of a DCT/IDCT apparatus according to the present invention.

Referring to FIG. 4, the first preferred embodiment of a DCT/IDCT apparatus according to the present invention is shown to comprise an input unit 1, a butterfly operation unit 2, a multiplication operation unit 3, a data register unit 4, an output unit 5 and a control unit 6.

The input unit 1 is a demultiplexer which receives a sequence of serial input data (Din) of an 8×8 data block from an external device (not shown). The input unit 1 is operable so as to send the input data (Din) to the butterfly operation unit 2 or to the multiplication operation unit 3 in accordance with the intended transform operation.

The butterfly operation unit 2 includes a multiplexer 21 and a butterfly circuit 22. The butterfly circuit 22 generates the sum and difference of two input data thereto. The multiplexer 21 has a select input which is connected to the control unit 6 and data inputs which are connected to the input unit 1 and the data register unit 4. The control unit 6 controls the multiplexer 21 to select the input data (Din) from the input unit 1 or data from the data register unit 4, and provides the selected data to the butterfly circuit 22 to enable the latter to perform a butterfly operation. The output of the butterfly circuit 22 is stored in the data register unit 4 or is sent to the output unit 5.

The multiplication operation unit 3 includes an input select multiplexer 31, an addition/subtraction circuit 32, a multiplier circuit 33, a coefficient read-only memory (ROM) 34, and an output select multiplexer 35. The coefficient ROM 34 contains a plurality of weighing coefficients that serve as one of the operand inputs to the multiplier circuit 33. The multiplication operation unit 3 is capable of performing intrinsic multiplication, post-addition multiplication and post-multiplication subtraction. Input data (Din) from the input unit 1 or data from the data register unit 4 is sent to the addition/subtraction circuit 32 or to the input select multiplexer 31 in order to enable the multiplication operation unit 3 to perform the intended arithmetic operation. The outputs of the addition/subtraction circuit 32 and the multiplier circuit 33 are sent to the output select multiplexer 35 so as to be stored in the data register unit 4. The output of the multiplier circuit 33 can also be sent directly to the output unit 5.

When the multiplication operation unit 3 executes an intrinsic multiplication operation, the selected data from the input select multiplexer 31 is sent to the multiplier circuit 33. At the same time, the coefficient ROM 34 is controlled by the control unit 6 so as to provide a predetermined one of the weighing coefficients to the multiplier circuit 33, thereby enabling the latter to perform an intrinsic multiplication operation.

When the multiplication operation unit 3 executes a post-addition multiplication operation, the addition/subtraction circuit 32 receives two successive input data from the data register unit 4. The sum of the input data is then sent to the multiplier circuit 33. At the same time, the coefficient ROM 34 is controlled by the control unit 6 so as to provide a predetermined one of the weighing coefficients to the multiplier circuit 33, thus enabling the latter to complete the post-addition multiplication operation.

When the multiplication operation unit 3 executes a post-multiplication subtraction operation, two successive data from the data register unit 4 are respectively received by the addition/subtraction circuit 32 and the multiplier circuit 33. At the same time, the coefficient ROM 34 is controlled by the control unit 6 so as to provide a predetermined one of the weighing coefficients to the multiplier circuit 33. The product output of the multiplier circuit 33 serves as the other input to the addition/subtraction circuit 32. The addition/subtraction circuit 32 subtracts the data from the data register unit 4 from the product output of the multiplier circuit 33, thus completing the post-multiplication subtraction operation.

The data register unit 4 is a four-port register file, such as a random access memory (RAM) with two write ports (WP1, WP2) and two read ports (RP1, RP2). The first set of read and write ports (RP1, WP1) of the data register unit 4 are connected to the butterfly operation unit 2, while the second set of read and write ports (RP2, WP2) of the same are connected to the multiplication operation unit 3. The data register unit 4 serves to store data from the butterfly operation unit 2 and the multiplication operation unit 3, and serves to provide data thereto.

The output unit 5 is a multiplexer which selects the output of the butterfly circuit 22 or the multiplier circuit 33, depending on whether DCT or IDCT is being performed.

Finally, the control unit 6 is responsible for controlling the read/write operations of the coefficient ROM 34 and the data register unit 4, and is also responsible for controlling the various multiplexers 21, 31, 35. The control unit 6 is further responsible for controlling the timing of the operations of the remaining components of the DCT/IDCT apparatus of the present invention.

Figure 1:
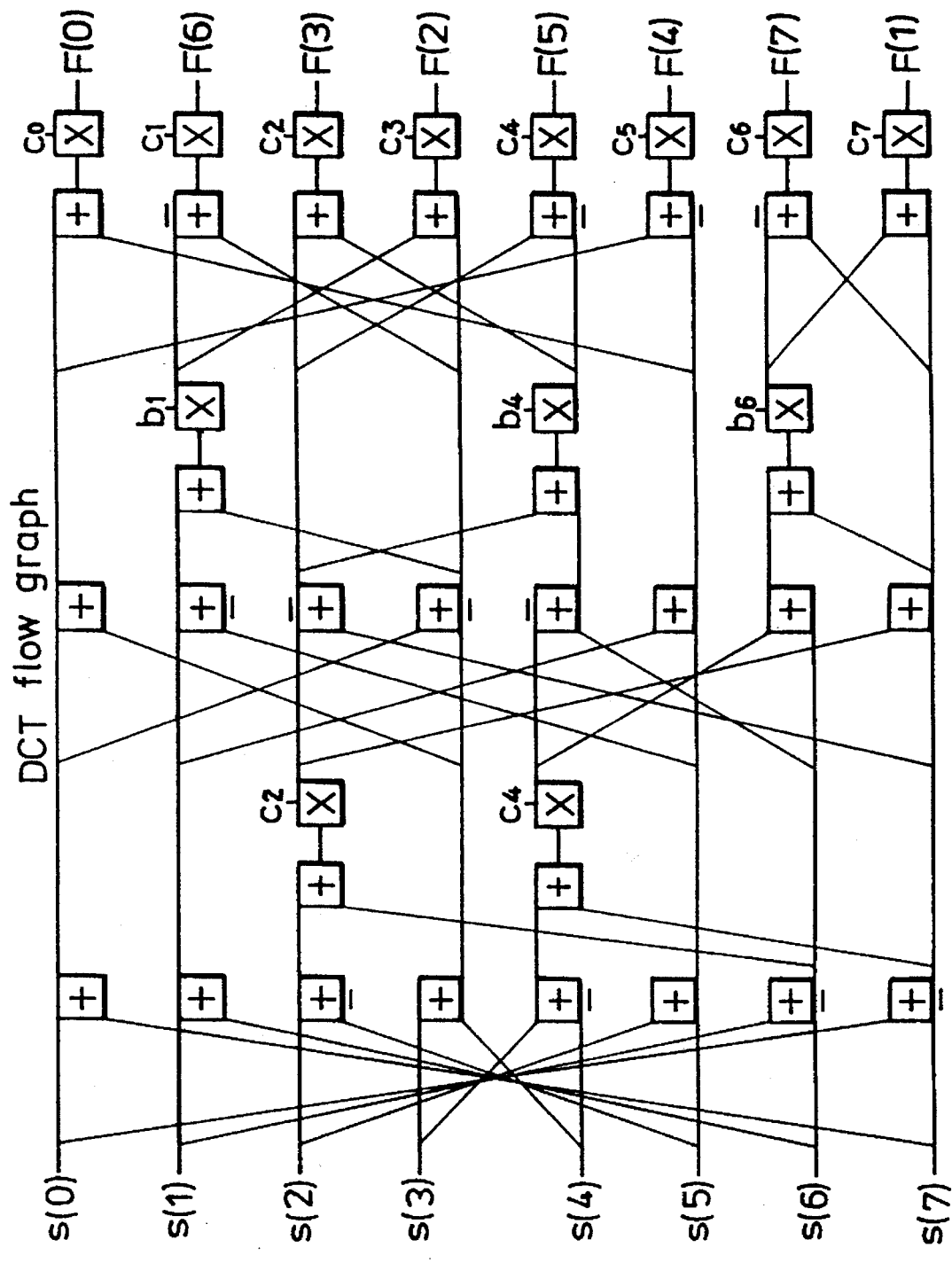
FIG. 1 is a flow graph of a DCT fast algorithm that is to be performed by the DCT/IDCT apparatus of the present invention.
Figure 5:
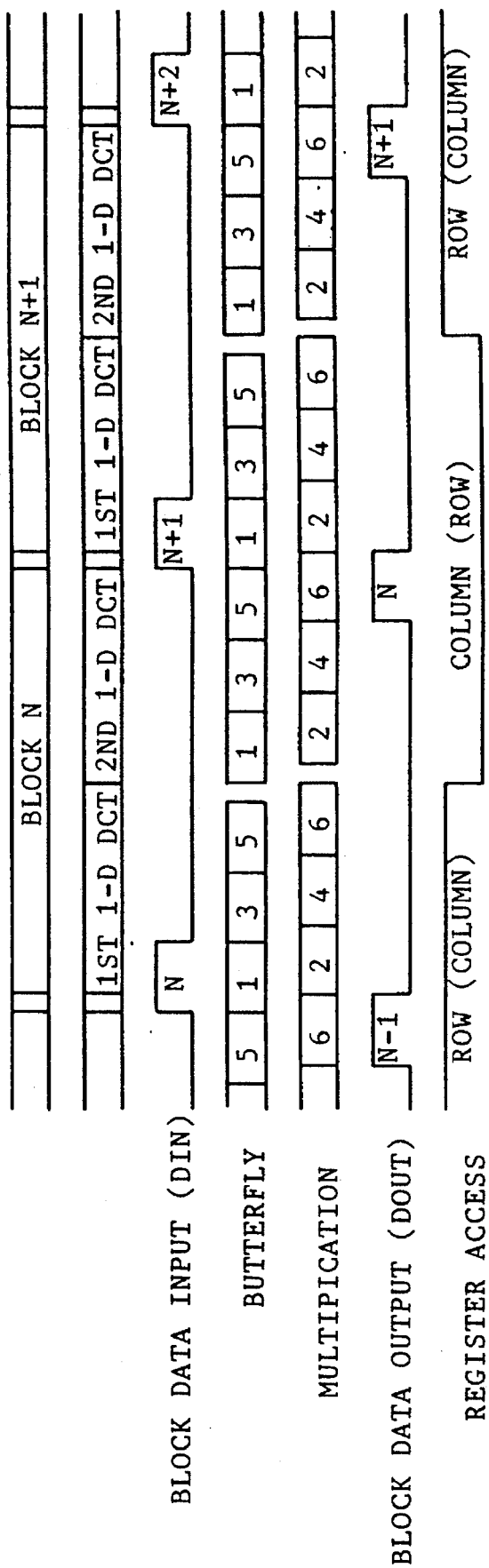
FIG. 5 is a timing diagram illustrating the operation of the first preferred embodiment during a DCT operation.
Figure 6:
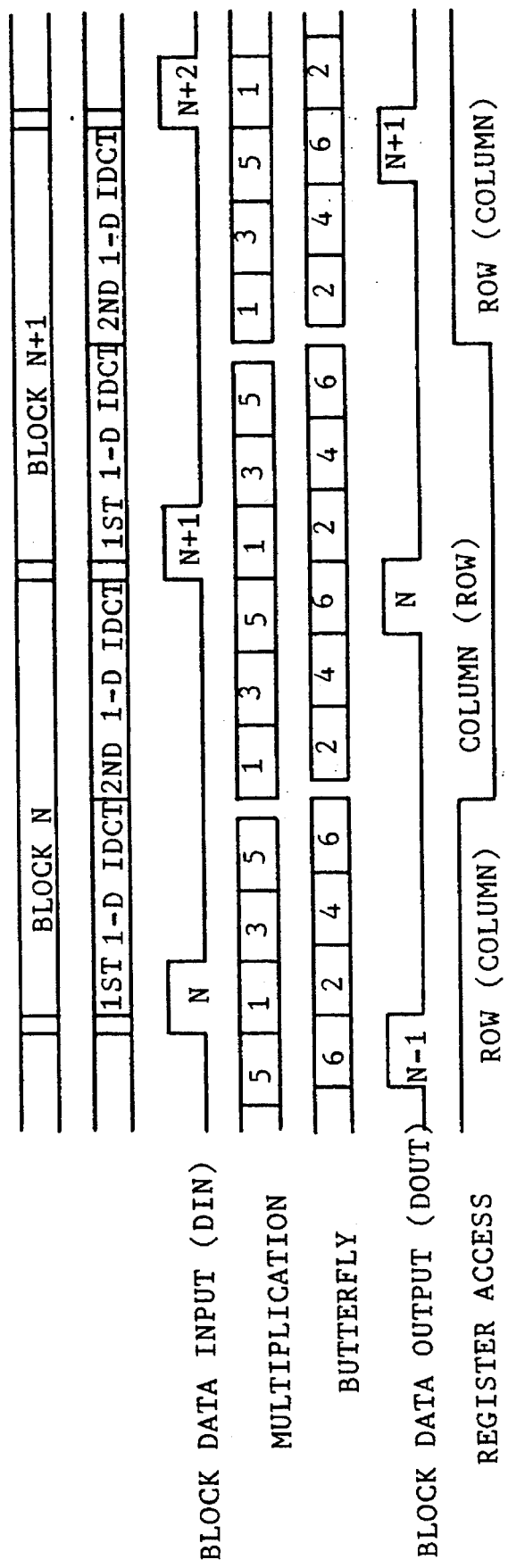
FIG. 6 is a timing diagram illustrating the operation of the first preferred embodiment during an IDCT operation.

FIGS. 5 and 6 are timing diagrams which illustrate the operation of the first preferred embodiment. For a data block (N) undergoing two-dimensional DCT/IDCT, a first transform data block is obtained after a first one-dimensional (1-D) DCT/IDCT operation. The first transform data block then undergoes a second 1-D DCT/IDCT in order to accomplish two-dimensional DCT/IDCT. Each 1-D DCT/IDCT operation can be accomplished in six operating stages which involve the use of the butterfly operation unit 2 or the multiplication operation unit 3. Referring to FIG. 5, the first, third and fifth stages of the DCT fast algorithm shown in FIG. 1 require the use of the butterfly operation unit 2, while the second, fourth and sixth stages of the DCT fast algorithm require the use of the multiplication operation unit 3. The second and fourth stages of the DCT fast algorithm involve post-addition multiplication operations, while the sixth stage of the DCT fast algorithm involves intrinsic multiplication operations. Referring to FIG. 6, the first, third and fifth stages of the IDCT fast algorithm shown in FIG. 3 require the use of the multiplication operation unit 3, while the second, fourth and sixth stages of the IDCT fast algorithm require the use of the butterfly operation unit 2. The first stage of the IDCT fast algorithm involves intrinsic multiplication operations, while the third and fifth stages of the IDCT fast algorithm involves post-multiplication subtraction operations. In the present invention, the first stage of the first 1-D DCT/IDCT is performed immediately upon reception of the input data block (N). The results of the two-dimensional DCT/IDCT can be obtained from the output of the sixth stage of the second 1-D DCT/IDCT.

Note that the results of the first to fifth stages of a 1-D DCT/IDCT operation are stored in the data register unit 4 so that the data inputs to the second to sixth stages of the 1-D DCT/IDCT operation can be obtained from the latter. When the first preferred embodiment is used to perform a two-dimensional DCT/IDCT operation, the results of the sixth stage of the first 1-D DCT/IDCT operation of a data block (N) are preferably stored in the data register unit 4. This is necessary since the transform data block obtained from the first 1-D DCT/IDCT operation has to be processed in columns if the original data block was input in rows. The transform data block that is generated during the first 1-D DCT/IDCT operation overwrites the transform data block obtained from the second 1-D DCT/IDCT operation of a preceding data block. Note that the construction of the data register unit 4 permits the butterfly operation unit 2 and the multiplication operation unit 3 to read and write data therein at the same time, thus enabling the latter two to achieve parallel pipeline processing. The data register unit 4 further permits each of the butterfly operation unit 2 and the multiplication operation unit 3 to perform three DCT/IDCT fast algorithm operating stages in succession when processing data.

The following is a detailed description of the operation of the first preferred embodiment:

1. Referring again to FIGS. 4 and 5, when the first preferred embodiment is employed so as to perform 1-D DCT, the sixty-four pixel data of an 8×8 pixel block are sequentially provided to the input unit 1 in rows (or columns). The control unit 6 controls the input unit 1 to send the input pixel data (Din) to the butterfly operation unit 2 in order to enable the latter to perform the first stage of the DCT fast algorithm which involves four butterfly operations for each row (or column). The control unit 6 then controls the data register unit 4 so that the first-stage output data from the butterfly operation unit 2 are stored therein via the write port (WP1). When predetermined ones of the first-stage output data have been stored in the data register unit 4, the control unit 6 controls the data register unit 4 to provide the predetermined ones of the first-stage output data to the multiplication operation unit 3 via the read port (RP2) in order to enable the latter to perform the second stage of the DCT fast algorithm which involves two post-addition multiplication operations for each row (or column). The control unit 6 again controls the data register unit 4 to store the second-stage output data from the multiplication operation unit 3 therein via the write port (WP2). After the butterfly operation unit 2 has finished performing the first stage of the DCT fast algorithm, the control unit 6 controls the data register unit 4 to provide the first- and second-stage output data in a predetermined sequence to the butterfly operation unit 2 via the read port (RP1) in order to enable the latter to perform the third stage of the DCT fast algorithm which involves four more butterfly operations for each row (or column). The control unit 6 again controls the data register unit 4 to store the third-stage output data from the butterfly operation unit 2 therein via the write port (WP1). When predetermined ones of the third-stage output data have been stored in the data register unit 4, the control unit 6 controls the data register unit 4 to provide the predetermined ones of the third-stage output data to the multiplication operation unit 3 via the read port (RP2) in order to enable the latter to perform the fourth stage of the DCT fast algorithm which involves three post-addition multiplication operations for each row (or column). The control unit 6 again controls the data register unit 4 to store the fourth-stage output data from the multiplication operation unit 3 therein via the write port (WP2). After the butterfly operation unit 2 has finished performing the third stage of the DCT fast algorithm, the control unit 6 controls the data register unit 4 to provide the third- and fourth-stage output data in a predetermined sequence to the butterfly operation unit 2 via the read port (RP1) in order to enable the latter to perform the fifth stage of the DCT fast algorithm which involves another four butterfly operations for each row (or column). The control unit 6 again controls the data register unit 4 to store the fifth-stage output data from the butterfly operation unit 2 therein via the write port (WP1). The control unit 6 then controls the data register unit 4 to provide the fifth-stage output data to the multiplication operation unit 3 via the read port (RP2) in order to enable the latter to perform the sixth stage of the DCT fast algorithm which involves eight intrinsic multiplication operations for each row (or column). Note that the control unit 6 may control the output unit 5 so as to receive the sixth-stage output data from the multiplication operation unit 3 if 1-D DCT is performed. Otherwise, the control unit 6 controls the data register unit 4 so as to store the sixth-stage output data therein.

If two-dimensional DCT is performed, the control unit 6 controls the data register unit 4 to output sequentially the sixth-stage output data of the first 1-D DCT to the butterfly operation unit 2 in columns (or rows) via the read port (RP1) of the same, thereby starting the second 1-D DCT operation. The operation of the second 1-D DCT operation is substantially similar to the first 1-D DCT operation, the main difference residing in that, instead of writing the sixth-stage output data into the data register unit 4, the sixth-stage output data of the second 1-D DCT operation is received by the output unit 5 from the multiplier circuit 33. The sixth-stage output data serve as the final transformed data and are provided by the output unit 5 to an external device.

2. Referring again to FIGS. 4 and 6, when the first preferred embodiment is employed so as to perform 1-D IDCT, the sixty-four transform data of an 8×8 transform data block are sequentially provided to the input unit 1 in rows (or columns). The control unit 6 controls the input unit 1 to send the input transform data (Din) to the multiplication operation unit 3 in order to enable the latter to perform the first stage of the IDCT fast algorithm which involves eight intrinsic multiplication operations for each row (or column). The control unit 6 then controls the data register unit 4 so that the first-stage output data from the multiplication operation unit 3 are stored in the data register unit 4 via the write port (WP2) of the same. As the first-stage output data are stored in the data register unit 4, the control unit 6 controls the data register unit 4 to provide the available first-stage output data to the butterfly operation unit 2 via the read port (RP1) in order to enable the latter to perform the second stage of the IDCT fast algorithm which involves four butterfly operations for each row (or column). The control unit 6 again controls the data register unit 4 to store the second-stage output data from the butterfly operation unit 2 therein via the write port (WP1) of the same. When predetermined ones of the second-stage output data have been stored in the data register unit 4, the control unit 6 controls the data register unit 4 to provide the predetermined ones of the second-stage output data to the multiplication operation unit 3 via the read port (RP2) in order to enable the latter to perform the third stage of the IDCT fast algorithm which involves three post-multiplication subtraction operations for each row (or column). The control unit 6 again controls the data register unit 4 to store the third-stage output data from the multiplication operation unit 3 therein via the write port (WP2) of the same. After the butterfly operation unit 2 has finished performing the second stage of the IDCT fast algorithm, the control unit 6 controls the data register unit 4 to provide the second- and third-stage output data in a predetermined sequence to the butterfly operation unit 2 via the read port (RP1) in order to enable the latter to perform the fourth stage of the IDCT fast algorithm which involves four more butterfly operations for each row (or column). The control unit 6 again controls the data register unit 4 to store the fourth-stage output data from the butterfly operation unit 2 therein via the write port (WP1) of the same. When predetermined ones of the fourth-stage output data have been stored in the data register unit 4, the control unit 6 controls the data register unit 4 to provide the predetermined ones of the fourth-stage output data to the multiplication operation unit 3 via the read port (RP2) in order to enable the latter to perform the fifth stage of the IDCT fast algorithm which involves two post-multiplication subtraction operations for each row (or column). The control unit 6 again controls the data register unit 4 to store the fifth-stage output data from the multiplication operation unit 3 therein via the write port (WP2). After the butterfly operation unit 2 has finished performing the fourth stage of the IDCT fast algorithm, the control unit 6 controls the data register unit 4 to provide the fourth- and fifth-stage output data in a predetermined sequence to the butterfly operation unit 2 via the read port (RP1) in order to enable the latter to perform the sixth stage of the IDCT fast algorithm which involves another four butterfly operations for each row (or column). The control unit 6 may control the output unit 5 so as to receive the sixth-stage output data from the butterfly operation unit 2 if 1-D IDCT is performed. Otherwise, the control unit 6 controls the data register unit 4 to store the sixth-stage output data therein.

If two-dimensional IDCT is performed, the control unit 6 controls the data register unit 4 to output sequentially the sixth-stage output data of the first 1-D IDCT to the multiplication operation unit 3 in columns (or rows) via the read port (RP2) of the same, thereby starting the second 1-D IDCT operation. The operation of the second 1-D IDCT operation is substantially similar to the first 1-D IDCT operation, the main difference residing in that, instead of writing the sixth-stage output data into the data register unit 4, the sixth-stage output data of the second 1-D IDCT operation is received by the output unit 5 from the butterfly circuit 22. The sixth-stage output data are the retrieved pixel data and are provided by the output unit 5 to an external device.

Figure 7:
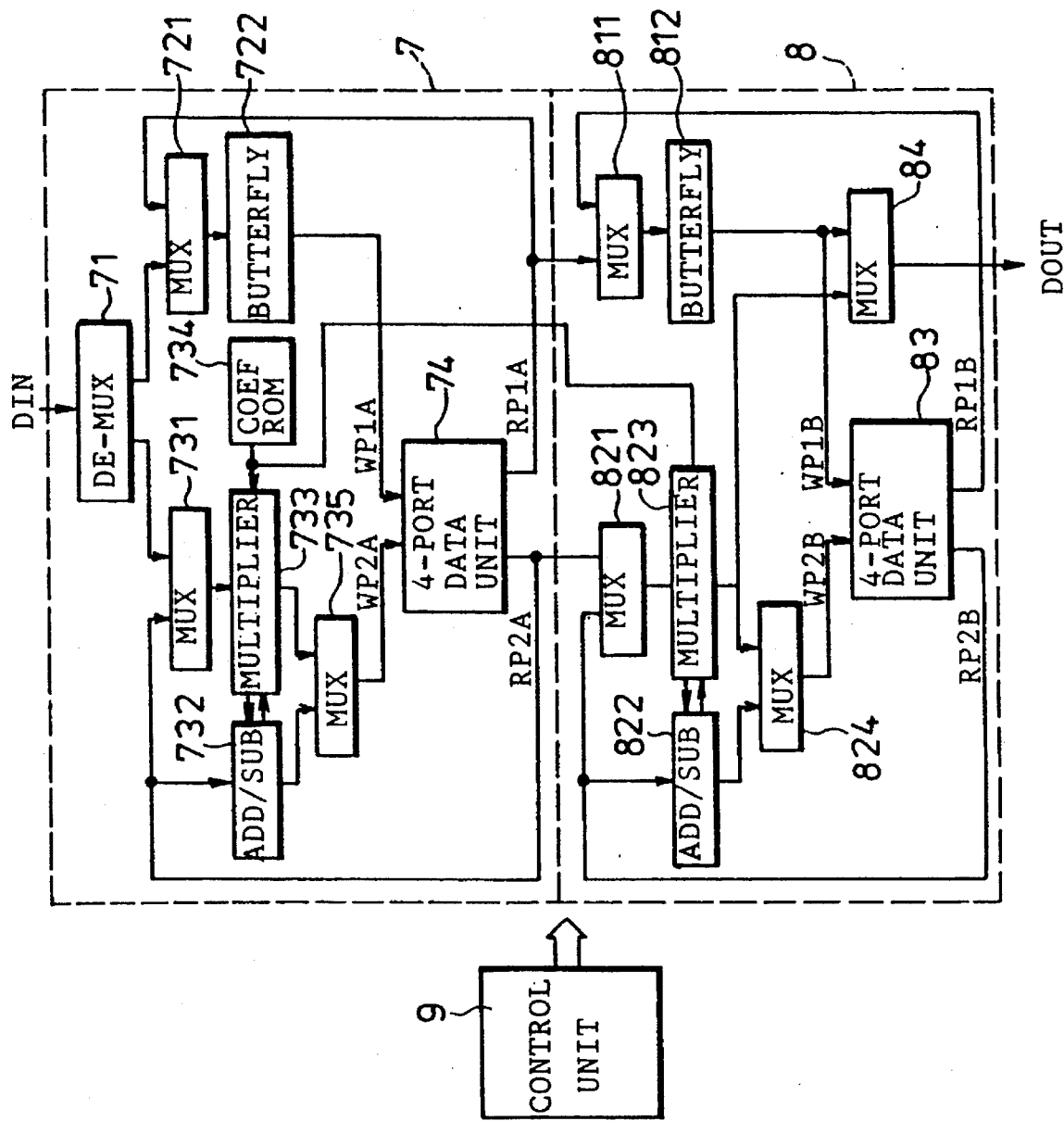
FIG. 7 is a schematic circuit block diagram of the second preferred embodiment of a DCT/IDCT apparatus according to the present invention.

Referring to FIG. 7, the second preferred embodiment of a DCT/IDCT apparatus according to the present invention is capable of performing two-dimensional DCT/IDCT pipeline processing of an 8×8 data block and is shown to comprise two 1-D DCT/IDCT apparatus 7, 8 and a control unit 9. Each of the 1-D DCT/IDCT apparatus 7, 8 is capable of performing the six-stage DCT and IDCT fast algorithms shown in FIGS. 1 and 3. The first 1-D DCT/IDCT apparatus 7 comprises: an input unit 71, such as a demultiplexer; a butterfly operation unit 72 including a multiplexer 721 and a butterfly circuit 722; a multiplication operation unit 73 including an input select multiplexer 731, an addition/subtraction circuit 732, a multiplier circuit 733, a coefficient ROM 734, and an output select multiplexer 735; and a first data register unit 74 which is responsible for storing the results of the six stages of the first 1-D DCT/IDCT operation and which also serves as a transpose memory for providing input data to the second 1-D DCT/IDCT apparatus 8. The second 1-D DCT/IDCT apparatus 8 comprises: a butterfly operation unit 81 including a multiplexer 811 and a butterfly circuit 812; a multiplication operation unit 82 including an input select multiplexer 821, an addition/subtraction circuit 822, a multiplier circuit 823, and an output select multiplexer 824; a second data register unit 83; and an output unit 84, such as a multiplexer. The multiplier circuits 733, 823 share a common coefficient ROM 734. The control unit 9 is responsible for controlling the read/write operations of the coefficient ROM 734 and the data register units 74, 83, and is also responsible for controlling the various multiplexers 721, 731, 735, 811, 821, 824. The control unit 9 is further responsible for controlling the timing of the operations of the remaining components of the first and second 1-D DCT/IDCT apparatus 7, 8.

Figure 8:
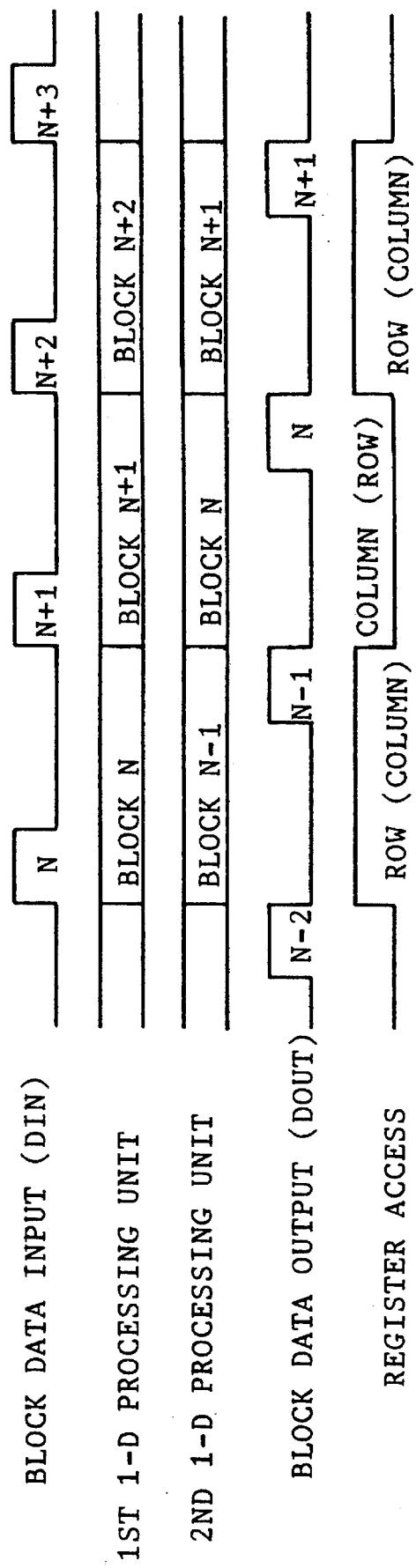
FIG. 8 is a timing diagram illustrating the operation of the second preferred embodiment.

Referring to FIGS. 7 and 8, during the operation of the second preferred embodiment, when the first 1-D DCT/IDCT apparatus 7 receives rows of input data (Din) corresponding to a data block (N), the second 1-D DCT/IDCT apparatus 8 receives columns of DCT/IDCT transform data corresponding to a previous data block (N−1) from the read port (RP1A) of the data register unit 74 if a two-dimensional DCT operation is being performed, or from the read port (RP2A) of the latter if a two-dimensional IDCT operation is being performed. As both 1-D DCT/IDCT apparatus 7, 8 perform the sixth stage of the DCT/IDCT fast algorithm, the final transform data corresponding to the data block (N−1) are received by the output unit 84 for transmission to an external device. Meanwhile, the DCT/IDCT transform data corresponding to the data block (N) are stored in the data register unit 74 in order to enable the second 1-D DCT/IDCT apparatus 8 to perform the same operation in columns.

The second preferred embodiment has a processing speed which is two times that of the first preferred embodiment, thus permitting a higher output bit rate.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A discrete cosine transform (DCT) method using a six-stage DCT fast algorithm for parallel processing a sequence of input data of an 8×8 data block so as to generate a sequence of transform data, said DCT fast algorithm including first, third and fifth stages, each of which involving a plurality of butterfly operations, second and fourth states, each of which involving a plurality of post-addition multiplication operations, and a sixth stage involving a plurality of intrinsic multiplication operations, said DCT method comprising the steps of:

(a) providing an input unit to receive said input data;

(b) controlling said input unit to provide said input data to a butterfly operation unit in order to enable said butterfly operation unit to perform said first stage of said DCT fast algorithm;

(c) controlling a data register unit to store first-stage output data from said butterfly operation unit therein;

(d) controlling said data register unit to provide predetermined ones of said first-stage output data to a multiplication operation unit in order to enable said multiplication operation unit to begin performing said second stage of said DCT fast algorithm when said predetermined ones of said first-stage output data have been stored in said data register unit, while said butterfly operation unit continues to perform said first-stage of said DCT fast algorithm;

(e) controlling said data register unit to store second-stage output data from said multiplication operation unit therein;

(f) controlling said data register unit to provide said first- and second-stage output data in a predetermined sequence to said butterfly operation unit in order to enable said butterfly operation unit to perform said third stage of said DCT fast algorithm after said butterfly operation unit has finished performing said first stage of said DCT fast algorithm;

(g) controlling said data register unit to store third-stage output data from said butterfly operation unit therein;

(h) controlling said data register unit to provide predetermined ones of said third-stage output data to said multiplication operation unit in order to enable said multiplication operation unit to begin performing said fourth stage of said DCT fast algorithm when said predetermined ones of said third-stage output data have been stored in said data register unit while said butterfly operation unit continues to perform said second stage of said DCT fast algorithm;

(i) controlling said data register unit to store fourth-stage output data from said multiplication operation unit therein;

(j) controlling said data register unit to provide said third- and fourth-stage output data in a predetermined sequence to said butterfly operation unit in order to enable said butterfly operation unit to perform said fifth stage of said DCT fast algorithm after said butterfly operation unit has finished performing said third stage of said DCT fast algorithm;

(k) controlling said data register unit to store fifth-stage output data from said butterfly operation unit therein;

(l) controlling said data register unit to provide said fifth-stage output data to said multiplication operation unit in order to enable said multiplication operation unit to perform said sixth stage of said DCT fast algorithm; and (m) controlling an output unit to receive sixth-stage output data from said multiplication operation unit.

2. The DCT method as claimed in claim 1, further comprising the steps of, between steps (l) and (m):

controlling said data register unit so as to store said sixth-stage output data therein;

controlling said data register unit to provide said sixth-stage output data to said butterfly operation unit in order to enable said butterfly operation unit to perform said first stage of said DCT fast algorithm; and repeating steps (c) to (l).

3. A one-dimensional discrete cosine transform (DCT) apparatus for performing a six-stage DCT fast algorithm to parallel process a sequence of input data of an 8×8 data block so as to generate a sequence of transform data, said DCT fast algorithm including first, third and fifth stages, each of which involving a plurality of butterfly operations, second and fourth stages, each of which involving a plurality of post-addition multiplication operations, and a sixth stage involving a plurality of intrinsic multiplication operations, said DCT apparatus comprising:

an input unit receiving said input data;

a butterfly operation unit controllable so as to perform said first, third and fifth stages of said DCT fast algorithm and so as to generate respectively first-, third- and fifth-stage output data when performing said first, third and fifth stages of said DCT algorithm;

a multiplication operation unit controllable so as to perform said second, fourth and sixth stages of said DCT fast algorithm and so as to generate respectively second-, fourth- and sixth-stage output data when performing said second, fourth and sixth stages of said DCT fast algorithm;

a data register unit connected to said butterfly operation unit and said multiplication operation unit and controllable so as to store said first-, second-, third-, fourth- and fifth-stage output data therein;

a control unit connected to said input unit, said butterfly operation unit, said data register unit and said multiplication operation unit;

said control unit controlling said input unit to provide said input data to said butterfly operation unit in order to enable said butterfly operation unit to perform said first stage of said DCT fast algorithm;

said control unit further controlling said data register unit to store said first-stage output data from said butterfly operation unit therein;

said control unit further controlling said data register unit to provide predetermined ones of said first-stage output data to said multiplication operation unit in order to enable said multiplication operation unit to begin performing said second stage of said DCT fast algorithm when said predetermined ones of said first-stage output data have been stored in said data register unit, while said butterfly operation unit continues to perform said first-stage of said DCT fast algorithm;

said control unit further controlling said data register unit to store said second-stage output data from said multiplication operation unit therein;

said control unit further controlling said data register unit to provide said first- and second-stage output data in a predetermined sequence to said butterfly operation unit in order to enable said butterfly operation unit to perform said third stage of said DCT fast algorithm after said butterfly operation unit has finished performing said first stage of said DCT fast algorithm;

said control unit further controlling said data register unit to store said third-stage output data from said butterfly operation unit therein;

said control unit further controlling said data register unit to provide predetermined ones of said third-stage output data to said multiplication operation unit in order to enable said multiplication operation unit to begin performing said fourth stage of said DCT fast algorithm when said predetermined ones of said third-stage output data have been stored in said data register unit, while said butterfly operation unit continues to perform said third-stage of said fast DCT algorithm;

said control unit further controlling said data register unit to store said fourth-stage output data from said multiplication operation unit therein;

said control unit further controlling said data register unit to provide said third- and fourth-stage output data in a predetermined sequence to said butterfly operation unit in order to enable said butterfly operation unit to perform said fifth stage of said DCT fast algorithm after said butterfly operation unit has finished performing said third sage of said DCT fast algorithm;

said control unit further controlling said data register unit to store said fifth-stage output data from said butterfly operation unit therein;

said control unit further controlling said data register unit to provide said fifth-stag output data to said multiplication operation unit in order to enable said multiplication operation unit to perform said sixth stage of said DCT fast algorithm; and an output unit connected to said multiplication operation unit and said control unit and controlled by said control unit so as to receive said sixth-stage output data from said multiplication operation unit.

4. The one-dimensional DCT apparatus as claimed in claim 3, wherein said butterfly operation unit comprises:

a multiplexer having a select input connected to said control unit and data inputs connected to said input unit and said data register unit, said multiplexer being controlled by said control unit so as to generate output data corresponding to a selected one of said input unit and said data register unit; and a butterfly circuit which is connected to said multiplexer and which receives said output data thereof.

5. The one-dimensional DCT apparatus as claimed in claim 3, wherein said multiplication operation unit comprises:

an addition/subtraction circuit which is connected to said control unit and said data register unit and which is controlled by said control unit so as to receive said predetermined ones of said first-stage and said third-stage output data from said data register unit and generate sums therefrom;

a multiplier circuit which is connected to said control unit, said data register unit and said addition/subtraction unit; and a coefficient ROM which is connected to said multiplier circuit and said control unit and which contains a plurality of weighing coefficients therein, said coefficient ROM being controlled by said control unit to output predetermined ones of said weighing coefficients;

said multiplier circuit receiving said sums from said addition/subtraction circuit and said predetermined ones of said weighing coefficients and generating products thereof which serve as said second- and fourth-stage output data when said multiplication operation unit performs said second and fourth stages of said DCT fast algorithm;

said multiplier circuit receiving said fifth-stage output data from said data register unit and said predetermined ones of said weighing coefficients and generating products thereof which serve as said sixth-stage output data when said multiplication operation unit performs said sixth stage of said DCT fast algorithm.

6. The one-dimensional DCT apparatus as claimed in claim 3, wherein said data register unit is a four-port random access memory with a first set of read and write ports connected to said butterfly operation unit and a second set of read and write ports connected to said multiplication operation unit.

7. An inverse discrete cosine transform (IDCT) method using a six-stage IDCT fast algorithm for parallel processing a sequence of input data of an 8×8 data block so as to generate a sequence of transform data, said IDCT fast algorithm including a first stage involving a plurality of intrinsic multiplication operations, second, fourth and sixth stages, each of which involving a plurality of butterfly operations, and third and fifth stages, each of which involving a plurality of post-multiplication subtraction operations, said IDCT method comprising the steps of:

(a) providing an input unit to receive said input data;

(b) controlling said input unit to provide said input data to a multiplication operation unit in order to enable said multiplication operation unit to perform said first stage of said IDCT fast algorithm;

(c) controlling a data register unit to store first-stage output data from said multiplication operation unit therein;

(d) controlling said data register unit to provide said first-stage output data to a butterfly operation unit in order to enable said butterfly operation unit to perform said second stage of said IDCT fast algorithm;

(e) controlling said data register unit to store second-stage output data from said butterfly operation unit therein;

(f) controlling said data register unit to provide predetermined ones of said second-stage output data to said multiplication operation unit in order to enable said multiplication operation unit to begin performing said third stage of said IDCT fast algorithm when said predetermined ones of said second-stage output data have been stored in said data register unit, while said butterfly operation unit continues to perform said second stage of said IDCT fast algorithm;

(g) controlling said data register unit to store third-stage output data from said multiplication operation unit therein;

(h) controlling said data register unit to provide said second- and third-stage output data in a predetermined sequence to said butterfly operation unit in order to enable said butterfly operation unit to perform said fourth stage of said IDCT fast algorithm after said butterfly operation unit has finished performing said second stage of said IDCT fast algorithm;

(i) controlling said data register unit to store fourth-stage output data from said butterfly operation unit therein;

(j) controlling said data register unit to provide predetermined ones of said fourth-stage output data to said multiplication operation unit in order to enable said multiplication operation unit to begin performing said fifth stage of said IDCT fast algorithm when said predetermined ones of said fourth-stage output data have been stored in said data register unit, while said butterfly operation unit continues to perform said fourth stage of said IDCT fast algorithm;

(k) controlling said data register unit to store fifth-stage output data from said multiplication operation unit therein;

(l) controlling said data register unit to provide said fourth- and fifth-stage output data in a predetermined sequence to said butterfly operation unit in order to enable said butterfly operation unit to perform said sixth stage of said IDCT fast algorithm after said butterfly operation unit has finished performing said fourth stage of said IDCT fast algorithm; and (m) controlling an output unit to receive sixth-stage output data from said butterfly operation unit.

8. The IDCT method as claimed in claim 7, further comprising the steps of, between steps (l) and (m):

controlling said data register unit so as to store said sixth-stage output data therein;

controlling said data register unit to provide said sixth-stage output data to said multiplication operation unit in order to enable said multiplication operation unit to perform said first stage of said IDCT fast algorithm; and repeating steps (c) to (l).

9. A one-dimensional inverse discrete cosine transform (IDCT) apparatus for performing a six-stage IDCT fast algorithm to parallel process a sequence of input data of an 8×8 data block so as to generate a sequence of transform data, said IDCT fast algorithm including a first stage involving a plurality of intrinsic multiplication operations, second, fourth and sixth stages, each of which involving a plurality of butterfly operations, and third and fifth stages, each of which involving a plurality of post-multiplication subtraction operations, said IDCT apparatus comprising:

an input unit receiving said input data;

a multiplication operation unit controllable so as to perform said first, third and fifth stages of said IDCT fast algorithm and so as to generate respectively first-, third- and fifth-stage output data when performing said first, third and fifth stages of said IDCT fast algorithm;

a butterfly operation unit controllable so as to perform said second, fourth and sixth stages of said IDCT fast algorithm and so as to generate respectively second-, fourth- and sixth-stage output data when performing said second, fourth and sixth stages of said IDCT fast algorithm;

a data register unit connected to said butterfly operation unit and said multiplication operation unit and controllable so as to store said first-, second-, third-, and fifth-stage output data therein;

a control unit connected to said input unit, said butterfly operation unit, said data register unit and said multiplication operation unit;

said control unit controlling said input unit to provide said input data to said multiplication operation unit in order to enable said multiplication operation unit to perform said first stage of said IDCT fast algorithm;

said control unit further controlling said data register unit to store said first-stage output data from said multiplication operation unit therein;

said control unit further controlling said data register unit to provide said first-stage output data to said butterfly operation unit in order to enable said butterfly operation unit to perform said second stage of said IDCT fast algorithm;

said control unit further controlling said data register unit to store said second-stage output data from said butterfly operation unit therein;

said control unit further controlling said data register unit to provide predetermined ones of said second-stage output data to said multiplication operation unit in order to enable said multiplication operation unit to begin performing said third stage of said IDCT fast algorithm when said predetermined ones of said second-stage output data have been stored in said data register unit, while said butterfly operation unit continues to perform said second stage of said IDCT fast algorithm;

said control unit further controlling said data register unit to store said third-stage output data from said multiplication operation unit therein;

said control unit further controlling said data register unit to provide said second- and third-stage output data in a predetermined sequence to said butterfly operation unit in order to enable said butterfly operation unit to perform said fourth stage of said IDCT fast algorithm after said butterfly operation unit has finished performing said second stage of said IDCT fast algorithm;

said control unit further controlling said data register unit to store said fourth-stage output data from said butterfly operation unit therein;

said control unit further controlling said data register unit to provide predetermined ones of said fourth-stage output data to said multiplication operation unit in order to enable said multiplication operation unit to begin performing said fifth stage of said IDCT fast algorithm when said predetermined ones of said fourth-stage output data have been stored in said data register unit, while Said butterfly operation unit continues to perform said fourth stage of said IDCT fast algorithm;

said control unit further controlling said data register unit to store said fifth-stage output data from said multiplication operation unit therein;

said control unit further controlling said data register unit to provide said fourth- and fifth-stage output data in a predetermined sequence to said butterfly operation unit in order to enable said butterfly operation unit to perform said sixth stage of said IDCT fast algorithm after said butterfly operation unit has finished performing said fourth stage of said IDCT fast algorithm; and an output unit connected to said butterfly operation unit and said control unit and controlled by said control unit so as to receive said sixth-stage output data from said butterfly operation unit.

10. The one-dimensional IDCT apparatus as claimed in claim 9, wherein said multiplication operation unit comprises:

a first multiplexer having a select input connected to said control unit and data inputs connected to said input unit and said data register unit, said first multiplexer being controlled by said control unit so as to generate output data corresponding to a selected one of said input unit and said data register unit;

a coefficient ROM which is connected to said control unit and which contains a plurality of weighing coefficients therein, said coefficient ROM being controlled by said control unit to output predetermined ones of said weighing coefficients;

a multiplier circuit connected to said control unit, said first multiplexer and said coefficient ROM, said multiplier circuit receiving said input data from said input unit via said first multiplexer and said predetermined ones of said weighing coefficients and generating products thereof which serve as said first-stage output data when said multiplication operation unit performs said first stage of said IDCT fast algorithm, said multiplier circuit further receiving said output data from said first multiplexer and said predetermined ones of said weighing coefficients and generating products thereof when said multiplication operation unit performs said third- and fifth-stages of said IDCT fast algorithm;

an addition/subtraction circuit connected to said control unit, said data register unit and said multiplier circuit, said addition/subtraction circuit being controlled by said control unit so as to receive said products from said multiplier circuit and said predetermined ones of said second- and fourth-stage output data from said data register unit and generate differences therefrom when said multiplication operation unit performs said third- and fifth-stages of said IDCT fast algorithm, said differences serving as said third- and fifth stage output data; and a second multiplexer having a select input connected to said control unit, data inputs connected to said multiplier circuit and said addition/subtraction circuit, and an output connected to said data register unit, said second multiplexer being controlled by said control unit so as to generate output data corresponding to a selected one of said multiplier circuit and said addition/subtraction circuit.

11. The one-dimensional IDCT apparatus as claimed in claim 9, wherein said data register unit is a four-port random access memory with a first set of read and write ports connected to said butterfly operation unit and a second set of read and write ports connected to said multiplication operation unit.

* * * * *